United States Patent Office 2,983,707
Patented May 9, 1961

2,983,707
STABILIZING CHLORINATED RUBBERY POLYMERS

Francis P. Baldwin, Colonia, Robert M. Thomas, Westfield, and Irving Kuntz, Roselle Park, N.J., assignors to Esso Research and Engineering Company, a corporation of Delaware No Drawing. Filed Oct. 22, 1957, Ser. No. 691,557
4 Claims. (Cl. 260—45.9)

This invention relates to rubbery polymeric compositions containing partially chlorinated copolymers of isoolefins and multiolefins, particularly chlorinated butyl rubber, and to the stabilization of such compositions. It also relates to compositions containing partially chlorinated (hereinafter referred to as chlorinated) copolymers of isoolefins and multiolefins together with minor proportions of certain organic aromatic or heterocyclic stabilizers. This is a continuation-in-part of U.S. patent application Serial No. 618,796 filed October 29, 1956.

In accordance with the present invention, it has now been found that while vulcanizates of isoolefin-multiolefin copolymers such as butyl rubber do not respond to stabilization by certain aromatic or heterocyclic stabilizing compounds, vulcanizates of the chlorinated derivatives of these copolymers are surprisingly improved by these stabilizing compounds as to resistance to oxidative degradation and as to heat aging resistance, particularly of the zinc oxide and/or primary or polyfunctional amine-cured vulcanizates or covulcanizates.

In practicing the present invention, the unvulcanized chlorinated isoolefin-multiolefin-containing copolymer, prior to curing, is blended at a temperature between about 0° and 200° C. with about 0.05 to 20, advantageously about 0.1 to 10.0, preferably 0.5 to 5.0 weight percent of one or more of the organic aromatic or heterocyclic stabilizing compounds enumerated hereinafter. This may be accomplished in several manners. In the preferred embodiment of the invention, about ⅛ to ⅞ of the organic stabilizing compound required is blended with the unvulcanized chlorinated copolymer slurry when the copolymer is recovered (i.e., precipitated and/or injected into a hot aqueous medium) but prior to the drying, milling and/or extruding steps.

It is a further discovery of the present invention that when stabilized, chlorinated isoolefin-multiolefin copolymers (particularly chlorinated butyl rubbers, stabilized in accordance with the invention) are cured by zinc oxide and/or primary or polyfunctional amines in the substantial absence of added elemental sulfur and sulfur-containing ultra-accelerators such as derivatives of thiuram or carbamic acids, but in the presence of minor proportions of resinous polymerized hydroxy aromatic (or heterocyclic) dialcohol compounds, particularly about 0.1 to 20, preferably about 0.5 to 10.0 weight percent of dimethylol phenolic resins, stabilized vulcanizates are produced which surprisingly exhibit not only resistance to thermal deterioration but also a combination of unusually high resistance to flexure and fatigue.

The foregoing dialcohol resins are produced by heating the monomeric phenol dialcohol at temperatures of between about 75° and 175° C. (e.g., 125° C.), care being taken to terminate the reaction while the resin is in the soluble (i.e., in organic solvents) and fusible state. Vulcanizates or covulcanizates of this last-mentioned type are especially useful in tires (especially in the carcass, undertread and bead areas), in tire casing curing bags or diaphragms, and in steam hose or similar articles.

The organic stabilizing compounds employed in accordance with the present invention have boiling points between about 100° and 700° C. and are chosen from the category enumerated hereinafter, the members of which may be used singly or in combination.

(I) Aromatic or heterocyclic amines such as substituted or unsubstituted poly-secondary amines having about 1 to 5 nitrogen atoms and containing attached to at least one nitrogen and/or carbon atoms, at least one (preferably 1 to 8) substituent having about 1 to 24, preferably about 1 to 18 carbon atoms; the substituents and total number of carbon atoms present in such compound being as set forth: said substituents being selected from the group consisting of alkyl, alkaryl, aryl, aralkyl, alkoxy, aryloxy, aroyl, acyl, acyloxy, and mixtures thereof. The total number of carbon atoms present in such compounds is generally between about 7 and 60, advantageously about 7 to 48, and preferably about 8 to 42. Typical compounds falling within category (I) include: N,N'-diphenyl-p-phenylene diamine; N,N'-dioctyl-p-phenylene diamine; diphenyl ethylene diamine; p,p'-diamino diphenyl methane; and/or N,N'-di-beta-naphthyl-p-phenylene diamine.

Copolymers of the general type hereinbefore mentioned, which are desirably chlorinated and stabilized with aromatic or heterocyclic compounds in accordance with the invention, especially where the copolymer comprises a major proportion (preferably about 85 to 99.5%) of a $C_4$ to $C_8$ isoolefin such as isobutylene, 2-methylbutene-1 or 3-methyl butene-1, etc., with a minor proportion (preferably about 15 to 0.5 weight percent) of a multiolefin of about 4 to 14, preferably about 4 to 6 carbon atoms, are commonly referred to in patents and technical literature as "butyl rubber," or GR–I rubber (Government Rubber-Isobutylene), for example in textbook "Synthetic Rubber" by G. S. Whitby. The preparation of butyl rubber is also described in U.S. Patent 2,356,128 to Thomas et al. and in U.S. application Serial No. 512,182, filed May 31, 1955, to Baldwin et al. The multiolefinic component of the copolymer is preferably a conjugated diolefin such as isoprene, butadiene, dimethylbutadiene, piperylene, or such multiolefins as cyclopentadiene, cyclohexadienes, dimethallyl, allo-ocymene, vinyl fulvenes, etc. The copolymer comprising isobutylene and isoprene is preferred, although the copolymer may contain about 0.05 to 20.0, preferably about 0.2 to 5.0, parts by weight based on total reacting comonomers of such monoolefinic compounds as styrene, p-methyl styrene, alpha methyl styrene, indene, dihydronaphthalene, dichlorostyrene, p-chlorostyrene, mixtures thereof, etc.

The chlorinated, rubbery isoolefin-multiolefin-containing copolymers, particularly chlorinated butyl rubbers, which are advantageously stabilized by aromatic or heterocyclic compounds in accordance with the present invention are derived from the foregoing isoolefin-multiolefin hydrocarbon copolymers. They are produced by carefully chlorinating these copolymers in a manner which does not degrade the molecular weight thereof, as more fully described hereinafter. The resulting chlorinated copolymers do not require sulfur or ultra-accelerators in their vulcanization and may be vulcanized solely by zinc oxide and/or primary or polyfunctional amines. The vulcanizates and covulcanizates with other rubbery polymers such as natural and GR–S rubbers formed have been found to exhibit good stress-strain properties and to have superior heat aging resistance compared to the corresponding unchlorinated copolymers. Since these chlorinated copolymers already possess heat aging resistance superior to the unchlorinated copolymers, and the unchlorinated copolymers are not improved as to heat aging resistance by the addition thereto of aromatic and heterocyclic compounds hereinafter more fully described, it is most unexpected that such aromatic or heterocyclic compounds have now been found to even further improve the heat aging resistance of the chlorinated copolymers.

Suitable processes for chlorinating isoolefin-multiolefin containing copolymers are disclosed and claimed in copending application, Serial No. 512,182. In accordance with the disclosure of this last-mentioned application, butyl rubber or similar more highly unsaturated copolymers or tripolymers are chlorinated so as to contain about at least 0.5 weight percent (preferably at least about 1.0 weight percent) combined chlorine but not more than about "X" weight percent combined chlorine wherein:

$$X = \frac{35.46L}{(100-L)M_1 + L(M_2 + 35.46)} \times 100$$

and $L$ = mole percent of the multiolefin in the polymer,
$M_1$ = molecular weight of the isoolefin,
$M_2$ = molecular weight of the multiolefin,
35.46 = atomic weight of chlorine.

Suitable chlorinating agents which may be employed are gaseous chlorine, alkali metal hypochlorites, $C_4$ to $C_{10}$ tertiary alkyl hypochlorites, sulfur chlorides, pyridinium chloride perchloride, N-chlorosuccinimide, alpha-chloroacetoacetanilide, N,N'-dichloro-5,5 dimethylhydantoin, trichlorophenol chloride, N-chloroacetamide, beta-chloro-methyl phthalimide, etc. The preferred chlorinating agents are gaseous chlorine, sulfuryl chloride, chloro-hydantoins, and related materials.

The chlorination is generally conducted at temperatures above about 0° to about +100° C., depending upon the particular chlorinating agent, for about one minute to several hours. An advantageous pressure range is from about 0.1 to 1000 p.s.i.a., atmospheric pressure being satisfactory. The chlorination may be accomplished by preparing 1 to 50 or 80 weight percent solutions of such copolymers as above, in a substantially inert liquid organic solvent such as a $C_3$ to $C_8$ substantially inert hydrocarbon or halogenated derivatives of saturated hydrocarbons; e.g., hexane, mineral spirits, cyclohexane, benzene, chlorobenzene, chloroform, carbon tetrachloride, mixtures thereof, etc., and adding thereto the chlorinating agent, which may optionally be in solution, such as dissolved in a substantially inert hydrocarbon, an alkyl chloride, carbon tetrachloride, carbon disulfide, etc. If chlorine gas is employed, it may also be diluted with up to about 50 times its volume, preferably about 0.1 to 5.0 times its volume of a substantially inert gas such as nitrogen, methane, carbon dioxide, etc.

The resulting chlorinated isoolefin-multiolefin-containing copolymer, particularly chlorinated butyl rubber polymer, may be recovered by precipitation with oxygenated hydrocarbons, particularly alcohols or ketones such as acetone or any other known non-solvent for the rubber and dried under about 1 to 760 millimeters or higher of mercury pressure absolute at about 0° to 180° C., preferably about 50° to 150° C. (e.g. 70° C.). Other methods of recovering the chlorinated polymer are by conventional spray or drum drying techniques. Alternatively, the solution of the chlorinated rubber may be injected into a vessel containing steam and/or agitated water heated to a temperature sufficient to volatilize the solvent and form an aqueous slurry of the chlorinated rubber. This chlorinated rubber may then be separated from this slurry by filtration and drying or recovered as a "crumb" or as a dense sheet or slab by conventional hot milling and/or extruding procedures.

As so produced, the chlorinated rubbery polymer has a Staudinger molecular weight within the range between approximately 15,000 to 200,000, preferably about 25,000 to 100,000; a Wijs iodine number between about 0.5 to 50, preferably about 5 to 15; and a mole percent unsaturation between about 0.1 to 30, preferably about 0.2 to 20.0. This copolymer, when cured, has a good elastic limit, tensile strength, abrasion resistance and flexure resistance and may be employed as an inner lining, the ply, tread base, tread or sidewall in tires; in tire curing bags or bladders, in rubber belting, in steam hose, as electrical insulation, etc.

The uncured, chlorinated butyl rubber may be blended with about 0.5 to 10%, of a group II metal silicate, particularly calcium silicate, and/or with about 1 to 5% of an adsorbent deactivator such as various high boiling polar compounds, e.g., ethylene glycol, during or preferably before the rubber is compounded with the hydrated silica and curatives.

The amount of hydrated silica added, per 100 parts by weight of chlorinated butyl rubber is generally about 10 to 75, preferably about 20 to 40 parts by weight for the tie ply compositions, and somewhat higher, say about 20–100, preferably about 30–75 parts for compositions suitable for inner linings of tires. To the compound containing about 0 to 100 parts by weight of hydrated silica, may also be blended about 20 to 200 parts of a carbon black, preferably a thermal black for inner lining compositions or a channel black (or thermal black) for tie ply compositions. For inner lining compositions, about 0 to 200, preferably about 50 to 150 parts by weight of mineral filler may be desirably employed. Such fillers include diatomaceous earth, montmorillonites, hard clays, soft clays, talc, lithopone, barytes, or alumina, etc.

Vulcanization of such compositions as the foregoing, when used in tie plies is generally for about 1 to 200 minutes at temperatures in the range of between about 250° to 400° F., preferably about 270° to about 380° F.

In order to more fully illustrate the present invention, the following experimental data are given.

CHLORINATED RUBBERS "A" TO "K"

Eleven runs are made chlorinating isoolefin-multiolefin copolymers. The amount of isoolefin and multiolefin in copolymer, chlorination agent, and amount of chlorine combined in the copolymer are tabulated hereinafter. Each recovery procedure is the same, namely by precipitation with acetone and redissolution in hexane three times. In each instance, when 100 parts by weight of the chlorinated copolymer formed is blended with 5 parts by weight of zinc oxide and 40 parts by weight of MPC carbon black and then cured for 40 minutes at 300° F., each resulting vulcanizate has a tensile strength in excess of 1,000 p.s.i. The molecular weight of each copolymer is also not substantially degraded. The data is as follows:

| Chlorinated Rubber | Isoolefin (Percent)[1] | Multiolefin (Percent)[1] | Chlorination Agent | (Percent) Cl in the Rubber[1] |
|---|---|---|---|---|
| A | Isobutylene (98) | Isoprene (2) | $SO_2Cl_2$ | 1.2 |
| B | Isobutylene (97.5) | Isoprene (2.5) | $Cl_2$ in $CCl_4$ | 1.4 |
| C | Isobutylene (95) | Isoprene (5.0) | $Cl_2$ in $CCl_4$ | 2.5 |
| D | Isobutylene (94) | Cyclopentadiene (6) | $Cl_2$ in $CCl_4$ | 2.0 |
| E | Isobutylene (92) | Myrcene (8.0) | $Cl_2$ in $CCl_4$ | 1.6 |
| F | 2-methyl-butene-1 (95) | Isoprene (5) | $Cl_2$ in $CCl_4$ | 1.3 |
| G | 3-methyl-butene-1 (96) | Butadiene (4) | $Cl_2$ in $CCl_4$ | 1.7 |
| H | Isobutylene (98) | 1-vinyl cyclohexene-3 (2) | $Cl_2$ in $CCl_4$ | 0.8 |
| I | Isobutylene (92) | Butadiene (8) | $Cl_2$ in $CCl_4$ | 2.4 |
| J | Isobutylene (85) | Isoprene (15) | $Cl_2$ in $CCl_4$ | 6.0 |
| K | Isobutylene (98) | Isoprene (2) | N,N'-dichloro-5,5-dimethyl hydantoin. | 1.1 |

[1] Note.—Percent in all instances is percent by weight.

Example I

A master batch, in parts by weight, was prepared of the recipe; stabilized, chlorinated butyl rubber, 100 (8 minute Mooney viscosity at 212° F. of 71, mole percent unsaturation of 1.47 and containing 1.3 weight percent combined chlorine); SRF carbon black, 50; zinc oxide, 5; and stearic acid, 0.5. To a portion of this master batch were added one weight percent based on polymer of the stabilizer N,N'-di-beta naphthyl-p-phenylene diamine. After curing at 300° F. for 60 minutes, samples were placed in a circulating air oven maintained at a temperature level of 297° F. (147° C.) for various lengths of time and their volume swell in cyclohexane then determined. The results were as follows:

Tensile strength (p.s.i.) _____ 1475
Elongation (percent) _____ 330
Modulus at 300% elong. (p.s.i.) _____ 1350

| Time of exposure (hours): | Percent volume swell in cyclohexane |
|---|---|
| 0 | 285 |
| 2 | 285 |
| 4 | 290 |
| 8 | 305 |
| 16 | 310 |
| 24 | 310 |
| 48 | 335 |
| 72 | 340 |

Example II

A commercial butyl rubber polymer having a Mooney viscosity at 212° F. for 8 minutes of 46, a mole percent unsaturation by the drastic iodine-mercuric acetate method of 1.8 and a viscosity average molecular weight of 350,000, was chlorinated so as to contain 1.25% chlorine. The chlorinated copolymer formed was in admixture with 0.2 weight percent of the stabilizer 2,6-ditertiary butyl-4-methyl phenol. A sample of 100 parts by weight of this mixture was compounded in parts by weight into the formulation: SRF black, 50; zinc oxide, 5; stearic acid, 0.5; and the amounts indicated hereinafter of various stabilizers or combinations of stabilizers:

| | Example II |
|---|---|
| 2,2'-methylene-bis (4-methyl-6-tertiary butyl phenol) | 0.5 |
| N,N'-di-beta-naphthyl-p-phenylene diamine | 0.5 |

The resulting stabilized, chlorinated butyl rubbers were then cured for 60 minutes at a temperature level of 300° F., the following physical inspections being noted:

| Property: | Example II |
|---|---|
| Tensile strength (p.s.i.) | 1390 |
| Elongation (percent) | 410 |
| Modulus at 300% elongation (p.s.i.) | 1000 |

Samples of the respective cured vulcanizates were then placed in a circulating air oven maintained at 297° F. (147° C.) for various lengths of time and their volume swell in cyclohexane then determined. The results were as follows:

| Time of exposure (hours): | Percent volume swell in cyclohexane, Example II |
|---|---|
| 0 | 325 |
| 2 | 315 |
| 4 | 315 |
| 8 | 315 |
| 16 | 330 |
| 24 | 325 |
| 48 | 350 |
| 72 | 345 |
| 96 | 395 |

The above data show that chlorinated butyl rubber, stabilized in accordance with the present invention with an admixture of organic stabilizing compounds, exhibits good thermal aging properties. Also, the stabilized, chlorinated butyl rubber vulcanizates did not become appreciably soluble in the cyclohexane, were not embrittled and did not crack upon flexing. Unstabilized, chlorinated butyl rubber, although superior to unmodified butyl rubber or brominated butyl rubber, would heat age only for about ½ of the above periods of time of exposure. GR–S or natural rubber when stabilized, compounded, treated and thermally aged as above, would become badly embrittled and would crack upon flexing. This example also illustrates the advantage of the use of the amine compond of this invention in admixture with aromatic or heterocyclic compounds containing at least one hydroxyl radical and one other substituent such as allyl, aryl, alkoxy, etc.

The compositions comprising stabilized, chlorinated isoolefin-multiolefin copolymers, particularly stabilized, chlorinated butyl rubber, in accordance with the present invention, may be employed alone or in admixture with other rubbers for a wide variety of applications other than those mentioned hereinbefore such as in electrical insulation, inner tubes, blown sponge rubber, car window channel strips, proofed goods and other applications where unmodified butyl rubber or certain chloroalkadiene rubbery homopolymers or copolymers have utility.

Resort may be had to various modifications and variations of the foregoing disclosed specific embodiments and examples without departing from the spirit of the invention or the scope of the appended claims.

What is claimed is:

1. A composition consisting essentially of a major proportion of the reaction product at a temperature of above 0° C. to about 100° C. of a rubbery copolymer of about 85 to 99.5 weight percent of a $C_4$ to $C_{10}$ isomonoolefin and about 0.5 to 15 weight percent of a $C_4$ to $C_{14}$ diolefin with a chlorinating agent; said reaction product having a Staudinger molecular weight of about 15,000 to 200,000, a mole percent unsaturation of 0.2 to 20.0 and containing at least about 0.5 weight percent combined chlorine on a basis of the total weight of copolymer but not more than about 1 combined atom of chlorine per double bond in said copolymer and 0.5 to 20 weight percent of a stabilizer, said stabilizer being N,N'-di-beta-naphthyl-p-phenylenediamine.

2. A composition consisting of a rubbery copolymer having a Staudinger molecular weight of between 30,000 and 150,000, a mole percent unsaturation of 0.2 to 20.0 and containing atoms of hydrogen, carbon and chlorine and further containing in its structure about 85 to 99.5 weight percent of hydrocarbon units derived by the copolymerization of anisomonoolefin containing about 4 to 10 carbon atoms with about 0.5 to 15 weight percent of a diolefin containing about 4 to 14 carbon atoms; said copolymer containing at least about 0.5 weight percent chlorine combined therein at a temperature level of above about 0° C. to about 100° C. but not more than about "X" weight percent combined chlorine wherein:

$$X = \frac{35.46L}{(100-L)M_1 + L(M_2+35.46)} \times 100$$

wherein:

$L$ = mole percent of the diolefin in the copolymer
$M_1$ = molecular weight of the isomonoolefin
$M_2$ = molecular weight of the diolefin
35.46 = atomic weight of chlorine;

said copolymer being in composition with about 0.1 to 20 weight percent of a stabilizer, said stabilizer being N,N'-di-beta-naphthyl-p-phenylene diamine.

3. A composition according to claim 2 in which the stabilizer is a combination of N,N'-di-beta-naphthyl-p-phenylene diamine and 2,2'-methylene-bis(4-methyl-6-tertiary butyl phenol) and 2,6-ditertiary butyl-4-methyl phenol.

4. An improved process for vulcanizing a butyl rubber copolymer of 85 to 99.5 weight percent of a $C_4$ to $C_8$ isomonoolefin with 0.5 to 15% of a $C_4$ to $C_{14}$ diolefin which consists essentially of dissolving the unvulcanized copolymer in a solvent, chlorinating the copolymer at a temperature level of above 0° C. to about 100° C. to contain at least about 0.5 weight percent combined chlorine but not more than about 1 atom of combined chlorine per double bond in the copolymer, the chlorinated copolymer formed having a Staudinger molecular weight of between about 15,000 and 200,000 and a mole percent unsaturation of 0.2 to 20.0, adding thereto about 0.1 to 20 weight percent of a stabilizer, said stabilizer being N,N'-di-beta-naphthyl-p-phenylene diamine and curing the resulting mixture at a temperature level of between about 250° and 400° F. in the presence of about 2 to 30 parts by weight of a basic metal compound selected from the group consisting of group II metal oxides, group II metal carboxylates and mixtures thereof and about 0 to 20 parts by weight of an amino compound selected from the group consisting of primary amines, diamines, and mixtures thereof, for about 1 to 200 minutes.

References Cited in the file of this patent

UNITED STATES PATENTS

| | | |
|---|---|---|
| 2,462,123 | Nelson | Feb. 22, 1947 |
| 2,529,060 | Trillich | Nov. 7, 1950 |
| 2,596,878 | Van Vessen | May 13, 1952 |
| 2,625,523 | Garber et al. | Jan. 13, 1953 |
| 2,716,096 | Young et al. | Apr. 23, 1955 |
| 2,725,373 | Reynolds | Nov. 29, 1955 |
| 2,732,354 | Morrissey et al. | Jan. 24, 1956 |
| 2,771,777 | Allison et al. | Nov. 27, 1956 |
| 2,804,448 | Hallenbeck | Aug. 27, 1957 |
| 2,809,372 | Fredrick et al. | Oct. 8, 1957 |
| 2,870,106 | Ridgway et al. | Jan. 20, 1959 |
| 2,877,189 | Olin | Mar. 10, 1959 |
| 2,891,595 | Kuntz | June 23, 1959 |

FOREIGN PATENTS

| | | |
|---|---|---|
| 147,952 | Australia | Aug. 27, 1952 |